United States Patent
Kishimoto et al.

(10) Patent No.: US 12,134,324 B2
(45) Date of Patent: Nov. 5, 2024

(54) ELECTRIC VEHICLE WITH ROTATING ELECTRICAL MACHINE, MOTOR CASE, INVERTER AND COOLING MECHANISM

(71) Applicant: TOYOTA JIDOSHA KABUSHIKI KAISHA, Aichi-ken (JP)

(72) Inventors: Naoyuki Kishimoto, Susono (JP); Fumiki Tanahashi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 455 days.

(21) Appl. No.: 17/542,498

(22) Filed: Dec. 6, 2021

(65) Prior Publication Data

US 2022/0242253 A1   Aug. 4, 2022

(30) Foreign Application Priority Data

Feb. 2, 2021   (JP) ................................. 2021-015037

(51) Int. Cl.
*H02K 9/00*   (2006.01)
*B60L 3/00*   (2019.01)
(Continued)

(52) U.S. Cl.
CPC ............. *B60L 50/51* (2019.02); *B60L 3/0061* (2013.01); *B60L 15/007* (2013.01);
(Continued)

(58) Field of Classification Search
CPC . H02K 11/30; H02K 9/00; H02K 9/08; H02K 9/12; H02K 9/14; H02K 9/16;
(Continued)

(56) References Cited

U.S. PATENT DOCUMENTS 2,862,120 A * 11/1958 Onrud .................. H02K 5/203
165/47
3,521,094 A * 7/1970 Helmut .................. H02K 9/197
310/58

(Continued)

FOREIGN PATENT DOCUMENTS

JP   2007159314 A   6/2007
JP   200867546 A   3/2008
(Continued)

OTHER PUBLICATIONS

JP-2009273276-A English Translation.*

*Primary Examiner* — Maged M Almawri
(74) *Attorney, Agent, or Firm* — HAUPTMAN HAM, LLP

(57) ABSTRACT

An electric vehicle includes a rotating electrical machine; a motor case that accommodates the rotating electrical machine; a cooling mechanism that supplies oil to the rotating electrical machine and cools the rotating electrical machine; an inverter that drives the rotating electrical machine; and a connecting member that electrically connects the inverter and the rotating electrical machine, wherein the electric vehicle is of a structure in which the inverter is integrated with the motor case, the cooling mechanism includes a supply port provided inside the motor case at a position upward from the rotating electrical machine to discharge the oil to the connecting member, and the connecting member includes a portion provided inwardly in a radial direction from an outer periphery of the rotating electrical machine inside the motor case, at a position upward from a rotation center of the rotating electrical machine and downward from the supply port.

15 Claims, 7 Drawing Sheets

(51) Int. Cl.
*B60L 15/00* (2006.01)
*B60L 50/51* (2019.01)

(52) U.S. Cl.
CPC ....... *B60L 2210/40* (2013.01); *B60L 2240/36* (2013.01); *B60L 2240/525* (2013.01)

(58) Field of Classification Search
CPC .......... H02K 9/193; H02K 9/19; H02K 9/197; B60L 50/51; B60L 3/0061; B60L 7/14; B60L 15/007; B60L 2210/40; B60L 2210/36; B60L 2210/425; B60L 2210/525; F16H 57/0421; F16H 57/0434; H05K 7/20927
USPC ................. 310/52, 89, 60 A, 54–62
See application file for complete search history.

(56) References Cited

U.S. PATENT DOCUMENTS

| | | | | |
|---|---|---|---|---|
| 3,681,628 A * | 8/1972 | Krastchew | ............... | H02K 9/00 310/52 |
| 3,863,083 A * | 1/1975 | Jaeschke | ............... | H02K 9/197 310/58 |
| 4,276,747 A * | 7/1981 | Faldella | ................. | F01K 25/06 60/676 |
| 4,285,107 A * | 8/1981 | Kusters | ................. | F16C 13/00 29/895.212 |
| 4,323,803 A * | 4/1982 | Danko | ..................... | H02K 9/10 165/104.19 |
| 4,346,361 A * | 8/1982 | Sauer | .................... | H01F 27/322 336/60 |
| 4,382,585 A * | 5/1983 | Fischer | .................... | C21B 7/10 266/190 |
| 4,399,382 A * | 8/1983 | Volkrodt | .................. | H02K 1/16 310/260 |
| 4,406,610 A * | 9/1983 | Duijvestijn | ............. | F23D 14/20 239/404 |
| 4,412,515 A * | 11/1983 | Fritzenwenger | ........ | F02B 61/02 123/198 C |
| 4,470,950 A * | 9/1984 | Hyde | ...................... | G21F 5/008 976/DIG. 344 |
| 4,499,926 A * | 2/1985 | Friberg | .................. | H01B 9/001 138/123 |
| 4,530,315 A * | 7/1985 | Mezger | .................. | F02B 75/22 123/41.74 |
| 4,553,585 A * | 11/1985 | Pfleger | .................... | F01P 11/08 165/145 |
| 4,587,659 A * | 5/1986 | Ungar | .................... | F27D 11/10 373/69 |
| 4,616,484 A * | 10/1986 | Mehdi | .................... | F25B 41/20 62/243 |
| 4,629,397 A * | 12/1986 | Schweitzer | ............ | F01D 5/284 416/241 B |
| 4,740,724 A * | 4/1988 | Sato | ....................... | H02K 55/04 310/43 |
| 4,790,721 A * | 12/1988 | Morris | .................... | F01D 5/284 416/241 B |
| 4,818,906 A * | 4/1989 | Kitamura | .............. | H02K 9/197 310/58 |
| 4,864,173 A * | 9/1989 | Even | ................... | H02K 49/043 188/161 |
| 4,933,593 A * | 6/1990 | Gerritsen | ............... | H01J 29/006 348/832 |
| 5,209,283 A * | 5/1993 | Miltzow | ............. | B22D 11/1287 492/46 |
| 5,293,089 A * | 3/1994 | Frister | .................. | H02K 5/203 310/64 |
| 5,494,424 A * | 2/1996 | Schnell | .................. | F04C 29/04 418/83 |
| 5,551,382 A * | 9/1996 | Bauer | .................... | F02F 1/40 123/193.5 |
| 5,616,973 A * | 4/1997 | Khazanov | ............... | H02K 5/203 310/58 |
| 5,664,916 A * | 9/1997 | Link | ........................ | B23Q 1/70 310/58 |
| 5,682,292 A * | 10/1997 | Salanki | ............... | H01F 27/2876 336/62 |
| 5,758,718 A * | 6/1998 | de Lazzer | ................. | F28D 9/00 165/149 |
| 5,774,517 A * | 6/1998 | Palavecino | ............ | G21C 15/02 376/377 |
| 5,915,346 A * | 6/1999 | Rehr | ........................ | F02F 1/14 123/41.82 R |
| 6,047,895 A * | 4/2000 | Pastleitner | ................ | F01P 7/14 236/34.5 |
| 6,167,847 B1 * | 1/2001 | Ergezen | .................... | F02F 1/16 123/41.79 |
| 6,198,183 B1 * | 3/2001 | Baeumel | .................. | H02K 5/225 310/52 |
| 6,222,289 B1 * | 4/2001 | Adames | .................. | H02K 5/203 310/58 |
| 6,257,326 B1 * | 7/2001 | Heinrich | .................... | C21B 7/10 165/169 |
| 6,300,693 B1 * | 10/2001 | Poag | ...................... | H02K 5/203 310/58 |
| 6,445,094 B1 * | 9/2002 | Lonardi | .................. | H02K 5/203 212/331 |
| 6,900,561 B2 * | 5/2005 | Vlemmings | ........... | H02K 5/203 310/58 |
| 6,909,210 B1 * | 6/2005 | Bostwick | ............... | H02K 5/203 310/58 |
| 7,314,037 B2 * | 1/2008 | Roithinger | .............. | F01L 13/06 123/41.31 |
| 7,591,147 B2 * | 9/2009 | Masoudipour | ........... | H02K 5/20 62/505 |
| 7,635,046 B2 * | 12/2009 | Tominaga | .............. | H02K 11/33 361/720 |
| 7,675,209 B2 * | 3/2010 | Masoudipour | ......... | H02K 5/203 310/89 |
| 7,989,997 B2 * | 8/2011 | Hashimoto | .......... | B62D 5/0406 310/68 R |
| 7,992,535 B2 * | 8/2011 | Steiner | .................... | F02B 39/14 123/196 AB |
| 8,061,131 B2 * | 11/2011 | Kuhlbach | ............... | F02B 75/18 123/193.5 |
| 8,146,543 B2 * | 4/2012 | Kuhlbach | ............... | F02F 1/243 123/193.5 |
| 8,339,801 B2 * | 12/2012 | Tominaga | ............. | B62D 5/0406 361/752 |
| 8,344,566 B2 * | 1/2013 | Koshida | .................. | B60K 6/40 310/85 |
| 8,593,021 B2 * | 11/2013 | Bradfield | ............... | H02K 5/203 310/60 A |
| 8,621,865 B2 * | 1/2014 | Mehring | .................... | F01P 3/12 60/605.3 |
| 8,823,223 B2 * | 9/2014 | Han | ....................... | B60L 3/0061 310/64 |
| 8,857,386 B2 * | 10/2014 | Kuhlbach | ............... | F02F 1/243 60/599 |
| 8,894,921 B2 * | 11/2014 | Wedde | .................. | F27D 17/004 165/104.19 |
| 8,912,694 B2 * | 12/2014 | Miura | .................... | H02K 5/203 310/58 |
| 9,287,747 B2 * | 3/2016 | Balzer | ...................... | H02K 9/10 |
| 10,819,189 B2 * | 10/2020 | Shinozaki | ............... | F28D 15/025 |
| 2002/0024262 A1 * | 2/2002 | Hayase | .................... | H01F 27/10 310/59 |
| 2003/0173920 A1 * | 9/2003 | Tominaga | ............. | B62D 5/0406 318/432 |
| 2005/0023909 A1 * | 2/2005 | Cromas | .................. | H02K 5/203 310/58 |
| 2005/0145205 A1 * | 7/2005 | Haubner | .................. | F02F 1/4214 123/41.31 |
| 2005/0167183 A1 * | 8/2005 | Tominaga | ........... | H05K 7/14322 180/444 |
| 2005/0189095 A1 * | 9/2005 | Damsohn | .................. | F28F 1/04 165/148 |
| 2005/0268464 A1 * | 12/2005 | Burjes | ...................... | F28F 3/12 29/890.035 |

(56) References Cited

U.S. PATENT DOCUMENTS

| | | | | |
|---|---|---|---|---|
| 2005/0285456 A1* | 12/2005 | Amagi | .................... | H02K 15/14 |
| | | | | 310/43 |
| 2006/0054112 A1* | 3/2006 | Paul | .................... | F02F 1/40 |
| | | | | 123/41.82 R |
| 2008/0030085 A1* | 2/2008 | Gizaw | .................... | H02K 5/203 |
| | | | | 165/108 |
| 2008/0223557 A1* | 9/2008 | Fulton | .................... | F28F 3/12 |
| | | | | 361/677 |
| 2009/0251018 A1* | 10/2009 | Koshida | .................... | H02K 5/225 |
| | | | | 310/71 |
| 2009/0289513 A1* | 11/2009 | Vadillo | .................... | H02K 11/33 |
| | | | | 310/63 |
| 2009/0315415 A1* | 12/2009 | Elnar | .................... | H02K 9/227 |
| | | | | 310/54 |
| 2010/0007227 A1* | 1/2010 | Smith | .................... | H02K 5/203 |
| | | | | 310/64 |
| 2010/0194233 A1* | 8/2010 | Wu | .................... | H02K 3/47 |
| | | | | 310/214 |
| 2011/0156508 A1* | 6/2011 | Minemura | .................... | H02K 9/19 |
| | | | | 310/54 |
| 2011/0168356 A1* | 7/2011 | Knight | .................... | H02K 11/33 |
| | | | | 165/104.19 |
| 2011/0169352 A1* | 7/2011 | Nagao | .................... | H02K 11/33 |
| | | | | 310/59 |
| 2011/0234029 A1* | 9/2011 | Pal | .................... | H02K 9/197 |
| | | | | 310/54 |
| 2011/0278970 A1* | 11/2011 | Lau | .................... | H02K 11/33 |
| | | | | 310/63 |
| 2012/0025638 A1* | 2/2012 | Palafox | .................... | H02K 9/10 |
| | | | | 310/52 |
| 2012/0217826 A1* | 8/2012 | Jiang | .................... | H02K 5/203 |
| | | | | 165/170 |
| 2013/0049495 A1* | 2/2013 | Matsuo | .................... | G06F 16/1748 |
| | | | | 310/59 |
| 2013/0049550 A1* | 2/2013 | Watanabe | .................... | F04B 39/121 |
| | | | | 310/67 R |
| 2013/0119832 A1* | 5/2013 | Nagao | .................... | H02K 5/203 |
| | | | | 310/68 B |
| 2013/0126143 A1* | 5/2013 | Sheu | .................... | F28F 1/00 |
| | | | | 165/177 |
| 2013/0169077 A1* | 7/2013 | Takei | .................... | H02K 9/193 |
| | | | | 310/54 |
| 2013/0234543 A1* | 9/2013 | Buttner | .................... | B60L 3/0061 |
| | | | | 310/54 |
| 2013/0328423 A1* | 12/2013 | Ikeda | .................... | H02K 5/203 |
| | | | | 310/54 |
| 2014/0069099 A1* | 3/2014 | Rohwer | .................... | B60L 3/0061 |
| | | | | 903/902 |
| 2014/0183988 A1* | 7/2014 | Kulkarni | .................... | H02K 1/20 |
| | | | | 310/54 |
| 2014/0361648 A1* | 12/2014 | Shirakata | .................... | H02K 9/00 |
| | | | | 310/52 |
| 2015/0130302 A1* | 5/2015 | Leberle | .................... | H02K 9/197 |
| | | | | 310/54 |
| 2015/0263583 A1* | 9/2015 | Urata | .................... | H02K 5/203 |
| | | | | 310/54 |
| 2016/0056683 A1* | 2/2016 | Nakanishi | .................... | H02K 5/18 |
| | | | | 310/54 |
| 2016/0185232 A1* | 6/2016 | Suzuki | .................... | B60K 31/06 |
| | | | | 903/945 |
| 2016/0272134 A1* | 9/2016 | Mackowiak | .................... | B60R 16/03 |
| 2019/0229584 A1* | 7/2019 | Shinozaki | .................... | F28D 15/025 |
| 2019/0260257 A1* | 8/2019 | Seki | .................... | H02K 5/203 |
| 2022/0111740 A1* | 4/2022 | Inoue | .................... | F16H 37/0813 |
| 2022/0149701 A1* | 5/2022 | Nakamatsu | .................... | H02K 5/20 |
| 2022/0200398 A1* | 6/2022 | Fukunaga | .................... | H01R 13/52 |

FOREIGN PATENT DOCUMENTS

| | | | |
|---|---|---|---|
| JP | 2009273276 A | * | 11/2009 |
| JP | 2011-234590 A | | 11/2011 |
| JP | 2021-003931 A | | 1/2021 |
| WO | 2020/202963 A1 | | 10/2020 |
| WO | 2020/213585 A1 | | 10/2020 |

* cited by examiner

ELECTRIC VEHICLE WITH ROTATING ELECTRICAL MACHINE, MOTOR CASE, INVERTER AND COOLING MECHANISM

CROSS-REFERENCE TO RELATED APPLICATION

This application claims priority to Japanese Patent Application No. 2021-015037 filed on Feb. 2, 2021, incorporated herein by reference in its entirety.

BACKGROUND

1. Technical Field

The disclosure relates to an electric vehicle.

2. Description of Related Art

Japanese Unexamined Patent Application Publication No. 2007-159314 (JP 2007-159314 A) discloses a cooling structure for cooling an inverter by supplying lubricating oil, stirred up by differential gears, to the inverter in an electric vehicle having a structure in which the inverter is integrated with a motor case.

SUMMARY

However, in the configuration described in JP 2007-159314 A, providing a passage for guiding the stirred-up lubricating oil to the inverter is necessary, resulting in a large structure. Further, when a motor is not being driven, the differential gears do not rotate and the lubricating oil is not stirred up, and accordingly a situation may occur in which the motor and the inverter are not cooled by the lubricating oil.

The disclosure has been made in view of the above circumstances, and it is an object thereof to provide an electric vehicle in which a motor and an inverter can be cooled using oil, without increasing the size of the structure.

An electric vehicle according to an aspect of the disclosure includes a rotating electrical machine, a motor case that accommodates the rotating electrical machine, a cooling mechanism that supplies oil to the rotating electrical machine and cools the rotating electrical machine, an inverter that drives the rotating electrical machine, and a connecting member that electrically connects the inverter and the rotating electrical machine. The electric vehicle is of a structure in which the inverter is integrated with the motor case. The cooling mechanism includes a supply port provided inside the motor case at a position upward from the rotating electrical machine to discharge the oil to the connecting member, and the connecting member includes a portion provided inwardly in a radial direction from an outer periphery of the rotating electrical machine inside the motor case, at a position upward from a rotation center of the rotating electrical machine and downward from the supply port.

According to this configuration, oil can be supplied to the connecting member connecting the inverter and the rotating electrical machine using the cooling mechanism that supplies oil to the rotating electrical machine. Thus, the rotating electrical machine and the inverter can be cooled using oil, without increase in the size of the structure.

Also, the inverter may be situated within a space surrounded by a first plane that is a same plane as an upper face of the motor case, a second plane that is a same plane as a front face or a rear face of the motor case, and an outer face of the motor case.

According to this configuration, reducing the size and the height of the structure improves the degree of freedom in installing mechanical-electrical integrated structure in which the inverter and the motor case are integrated, in the vehicle. This also enables application to various forms of transaxles. Further, due to the inverter being situated inwardly from the front face or the rear face of the motor case, the inverter is protected by the motor case in the event of a collision of the electric vehicle, and safety regarding the high-voltage electricity of the inverter can be ensured.

Also, a part of the connecting member may be provided at a same position as a position of the supply port in an axial direction of the rotating electrical machine.

According to this configuration, the oil discharged from the supply port can readily reach the connecting member.

Also, the electric vehicle may further include a cable configured to supply electric power from a battery to the inverter, the cable extending from an upper face side or a front face side of the inverter.

This configuration enables the direction in which the cable is laid from the inverter to be changed without changing the unit depending on the position of a part to which the cable is to be connected.

Also, the electric vehicle may further include an accessory part electrically connected to the inverter, the accessory part being situated upward from the motor case or integrated with an upper face of the motor case.

According to this configuration, the size and the height of the structure including the accessory part can be reduced.

Also, the cooling mechanism may further include a cooling pipe that is situated upward from the rotating electrical machine inside the motor case, and that discharges the oil to the rotating electrical machine to cool the rotating electrical machine, the supply port being provided to the cooling pipe.

According to this configuration, oil can be supplied to the connecting member connecting the inverter and the rotating electrical machine using the cooling pipe that supplies oil to the rotating electrical machine.

Also, the electric vehicle may further include a power transmission device in which a drive shaft is situated on an axis different from an axis of the rotating electrical machine. The motor case may be integrated with a transaxle case accommodating the power transmission device, an inside of the motor case and an inside of the transaxle case may communicate with each other, and the oil may lubricate the power transmission device.

According to the disclosure, oil can be supplied to the connecting member connecting the inverter and the rotating electrical machine using the cooling mechanism that supplies oil to the rotating electrical machine. Thus, the rotating electrical machine and the inverter can be cooled using oil, without increase in the size of the structure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An electric vehicle according to an embodiment of the disclosure will be described below in detail, with reference to the drawings. Note that the present disclosure is not limited to the embodiments described below.

Figure 1:
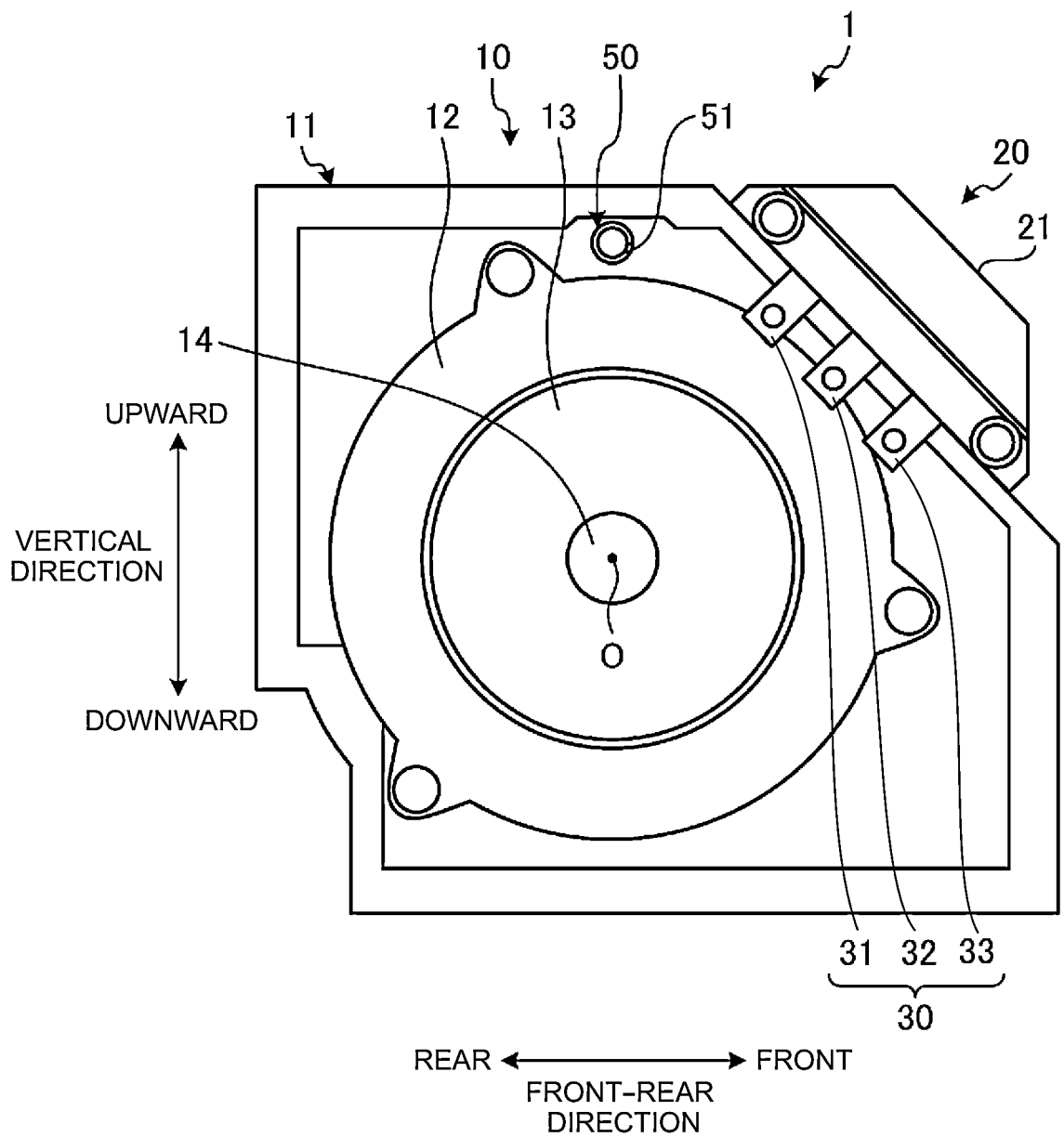
FIG. 1 is a diagram schematically illustrating a motor and an inverter provided to an electric vehicle of an embodiment.
Figure 2:
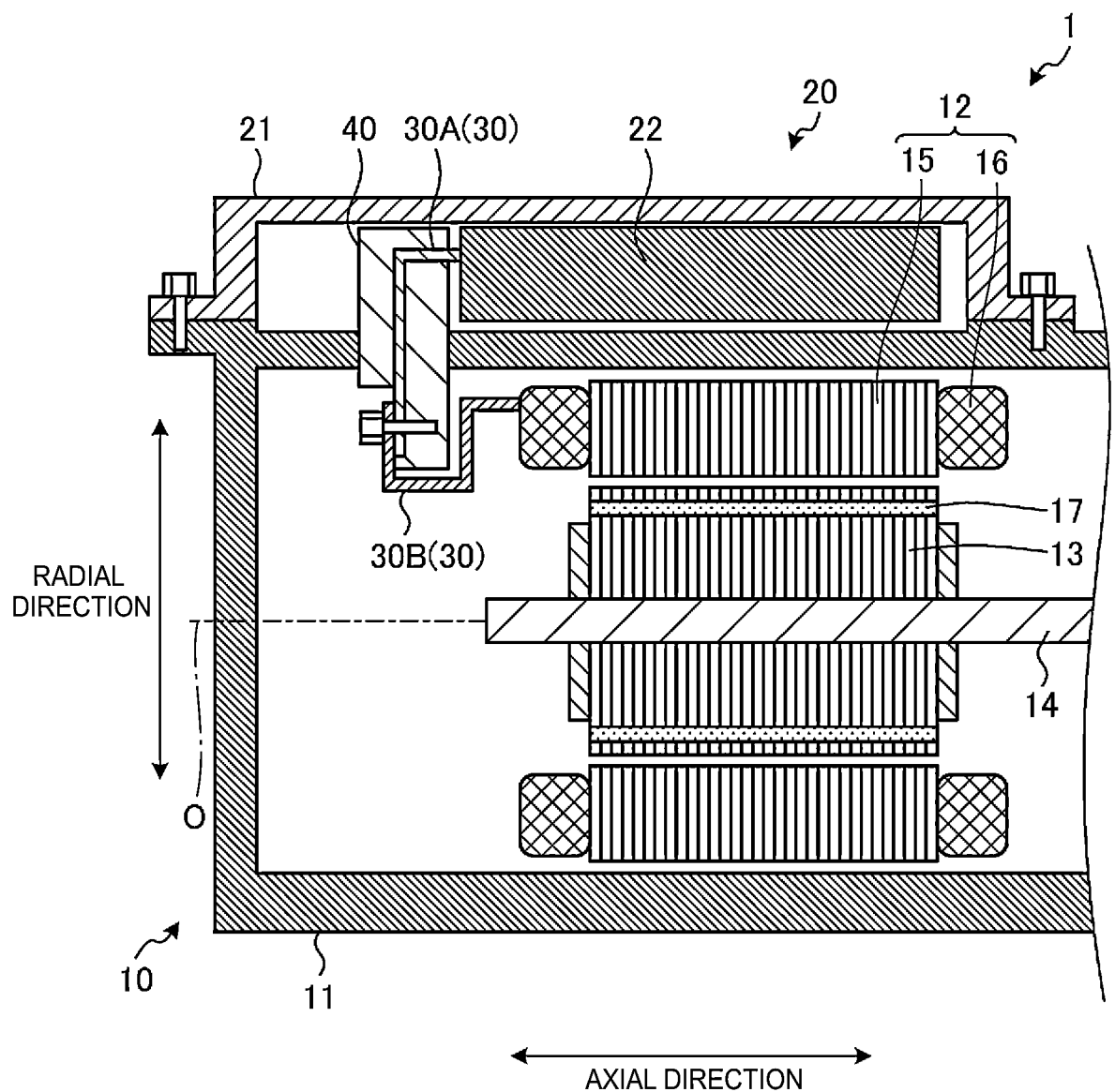
FIG. 2 is a schematic view for describing an internal structure of a motor case.

FIG. 1 is a diagram schematically illustrating a motor and an inverter provided to an electric vehicle of an embodiment. FIG. 2 is a schematic diagram for describing an internal structure of a motor case. An electric vehicle 1 includes a motor 10 and an inverter 20. The electric vehicle 1 is a vehicle that uses the motor 10 as a traction power source.

The motor 10 is provided with an annular stator 12 that is non-rotatably fixed to a motor case 11, an annular rotor 13 that is situated on an inner circumferential side of the stator 12, and a rotor shaft 14 that is linked to an inner circumference of the rotor 13. The motor case 11 is a case member that accommodates the motor 10. The stator 12, the rotor 13, and the rotor shaft 14 are accommodated within the motor case 11. As illustrated in FIG. 2, the stator 12 is configured including a stator core 15 and a stator coil 16. The stator coil 16 is wound upon the stator core 15. The stator coil 16 has coil end portions on both end sides in the axial direction of the stator core 15. The rotor 13 is a rotor that rotates integrally with the rotor shaft 14. A permanent magnet 17 is embedded inside the rotor 13. The rotor shaft 14 is rotatably borne with respect to the motor case 11 by a pair of bearings situated on both sides in the axial direction. In this way, the motor 10 is a three-phase alternating current (AC) motor in which the permanent magnet 17 is embedded in the rotor 13, and is a rotating electrical machine (motor/generator) that exhibits motor functions and electricity generating functions.

Also, the motor 10 is mechanically connected to driving wheels via a power transmission device, and generates torque for driving the electric vehicle 1. When braking the electric vehicle 1, the motor 10 can also generate electricity under input of kinetic energy of the electric vehicle 1 (regeneration). For example, when the electric vehicle 1 is a hybrid vehicle, the motor 10 is mechanically connected to an engine, and can perform regeneration under the power of the engine, and can also assist the power of the engine.

The inverter 20 is a power conversion device that converts direct current (DC) electric power supplied from a battery into AC electric power. The inverter 20 is accommodated inside an inverter case 21. The inverter case 21 is a case member for accommodating the inverter 20, and is attached to the motor case 11. That is to say, the inverter 20 is integrated with the motor case 11. The inverter 20 also includes an electronic part 22 accommodated inside the inverter case 21, as illustrated in FIG. 2. The electronic part 22 is an internal part of the inverter, and includes a plurality of switching devices and diodes.

For example, the inverter 20 is provided with a U-phase arm including a p-side switching device and an n-side switching device, a V-phase arm including a p-side switching device and an n-side switching device, and a W-phase arm including a p-side switching device and an n-side switching device. Each switching device of the inverter 20 is configured of, for example, an insulated-gate bipolar transistor (IGBT) or the like. Further, each phase arm of the inverter 20 is connected in parallel between a positive terminal line connected to the positive terminal of the battery and a negative terminal line connected to the negative terminal of the battery. That is to say, the inverter 20 is electrically connected to the battery. Diodes that allow electric current to flow from an emitter side to a collector side are connected to the switching devices of the inverter 20. An intermediate point between the p-side switching device and the n-side switching device of each of the phase arms is connected to a corresponding one of phase coils (U-phase coil, V-phase coil, W-phase coil) of the motor 10.

Also, the battery is a power storage device that stores electric power to be supplied to the motor 10, and is a secondary battery such as a nickel metal hydride battery or a lithium-ion battery, for example. The battery is electrically connected to the motor 10 via the inverter 20. The electric power stored in the battery is supplied to the motor 10 via the inverter 20.

The inverter 20 is also electrically connected to the motor 10 via a bus bar 30. The bus bar 30 is a connecting member that electrically connects the motor 10 and the inverter 20, and is a three-phase bus bar. The bus bar 30 is connected to the phase coils of the motor 10, and is connected to the electric power lines of the phases of the inverter 20. For example, as illustrated in FIG. 1, the bus bar 30 is provided with a U-phase bus bar 31 connected to the U-phase coil of the motor 10 and a U-phase electric power line of the inverter 20, a V-phase bus bar 32 connected to the V-phase coil of the motor 10 and a V-phase electric power line of the inverter 20, and a W-phase bus bar 33 connected to the W-phase coil of the motor 10 and a W-phase electric power line of the inverter 20.

Further, as illustrated in FIG. 2, the bus bar 30 has a bus bar 30A on the inverter 20 side and a bus bar 30B on the motor 10 side in each phase. The bus bar 30A on the inverter 20 side protrudes from the electronic part 22, with a distal end side (one end side) thereof disposed on a terminal block 40. The terminal block 40 is a part for wiring connection.

As illustrated in FIG. 2, the terminal block 40 is provided passing through a wall of the motor case 11, so as to project from the inside of the inverter case 21 to the inside of the motor case 11. Accordingly, one end side of the bus bar 30A on the inverter 20 side is situated inside the motor case 11, in a state of being disposed on the terminal block 40. Inside the motor case 11, the bus bar 30A on the inverter 20 side is connected to the bus bar 30B on the motor 10 side. The bus bar 30A and the bus bar 30B are connected by bolting, for example. On the other hand, the other end of the bus bar 30A on the inverter 20 side is connected to the electronic part 22 (e.g., the electric power lines of the respective phases of the inverter 20) inside the inverter case 21.

Also, the bus bar 30B on the motor 10 side protrudes from the coil end portion of the stator coil 16 inside the motor case 11. Further, one end side of the bus bar 30B is connected to the bus bar 30A on the inverter 20 side at the terminal block 40. The pair of bus bars 30A and 30B is situated so as to face each other in the axial direction and are in contact with each other. Note that this axial direction is the axial direction of the rotor shaft 14, and indicates the axial direction of the motor 10. Also, a rotation center O of the rotor 13 and the rotor shaft 14 may be referred to as the rotation center O of the motor 10.

Figure 3:
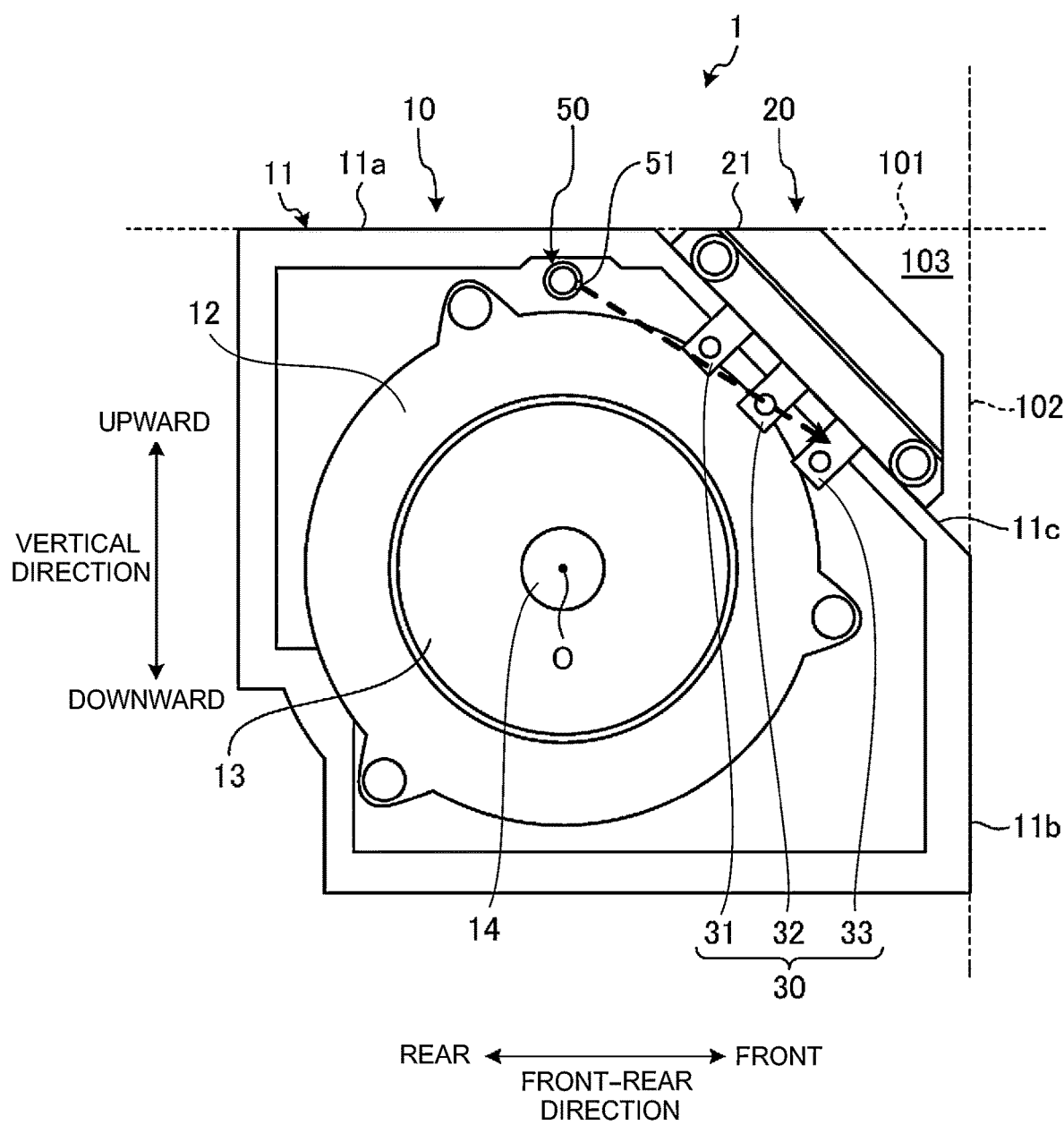
FIG. 3 is a diagram for describing oil supplied to a bus bar.

Further, the inverter case 21 is attached to the motor case 11, on the outside of the motor case 11. For example, the inverter case 21 is integrated with the motor case 11 by bolting, as illustrated in FIG. 2. Further, as illustrated in FIG. 3, the inverter 20 is situated in a space 103 surrounded by a first plane 101, which is the same plane as an upper face 11a of the motor case 11, a second plane 102, which is the same plane as a front face 11b of the motor case 11, an outer face 11c of the motor case 11. That is to say, the inverter 20 is situated at a position lower than the upper face 11a of the motor case 11. The inverter 20 is accommodated inwardly from (rearward of) the front face 11b of the motor case 11.

Further, a cooling pipe 50 for supplying oil to the motor 10, to cool the motor 10, is provided inside the motor case 11. The cooling pipe 50 is situated upward from the motor 10 in the vertical direction, and oil flows through the pipe.

The electric vehicle 1 includes a cooling mechanism that supplies oil to the motor 10 and cools the motor 10. The cooling mechanism includes an oil pump, a case oil passage formed in the motor case 11, the cooling pipe 50, and an oil reservoir. The oil reservoir is configured of an oil pan or the like formed at a lower part of the motor case 11. The oil pump suctions the oil stored in the oil reservoir and discharges the oil to the case oil passage. The case oil passage is connected to the cooling pipe 50. Oil is pumped through the case oil passage and the inside of the cooling pipe 50. The cooling pipe 50 situated upward from the stator 12 extends in the axial direction, causing oil to flow in the axial direction inside the motor case 11.

The cooling pipe 50 is provided with a discharge port for discharging oil to the motor 10. The discharge port is situated upward from the motor 10 and opens toward the motor 10. Accordingly, inside the motor case 11, oil is discharged vertically downward toward the motor 10 from the discharge port of the cooling pipe 50. Thus, oil is supplied to the motor 10 located downward from the cooling pipe 50. This oil is then stored in the oil reservoir after being supplied to the motor 10. That is to say, the cooling mechanism circulates the oil so that the oil returns to the cooling pipe 50 again. The cooling mechanism thus is a circulation mechanism that circulates oil.

Also, the electric vehicle 1 is configured to cool the bus bar 30 using the oil that cools the motor 10. That is to say, the cooling mechanism for cooling the motor 10 is configured to be used as a cooling mechanism for cooling the bus bar 30 and the inverter 20. To this end, the cooling pipe 50 has a supply port 51 for discharging oil to the bus bar 30. Note that the broken line arrow shown in FIG. 3 exemplifies the direction in which the oil discharged from the supply port 51 of the cooling pipe 50 is supplied.

The supply port 51 is provided at a position upward from the motor 10 inside the motor case 11, and opens toward the bus bar 30. The bus bar 30 is situated vertically downward from the supply port 51. As illustrated in FIG. 1, the portion of the bus bar 30 situated inside the motor case 11 is situated inwardly from the outer periphery of the motor 10 in the radial direction, at a position upward from the rotation center O of the motor 10 and downward from the supply port 51 in the vertical direction. The outer periphery of the motor 10 signifies the outer periphery of the stator 12. Thus, the oil discharged from the supply port 51 of the cooling pipe 50 can be supplied to the bus bar 30, as illustrated in FIG. 3. Also, the oil discharged toward the bus bar 30 will be supplied to an inner face of the motor case 11 at the position where the inverter 20 is situated. Accordingly, the portion of the motor case 11 at a position close to the inverter 20 can be cooled by oil.

Further, the portion of the bus bar 30 situated inside the motor case 11 is situated on the outside of the coil end portion of the stator coil 16 in the axial direction, as illustrated in FIG. 2. Accordingly, the supply port 51 is situated at a position corresponding to the position of the bus bar 30 in the axial direction. That is to say, part of the bus bar 30 is provided at the same position as the supply port 51 in the axial direction. That is, part of the bus bar 30 and the supply port 51 are situated at the same position in the axial direction. This facilitates supply of oil discharged from the supply port 51 to the bus bar 30. In this way, the cooling pipe 50 is provided with a discharge port (a port for cooling the motor) for discharging oil toward the motor 10, and the supply port 51 (a port for cooling the bus bar) for discharging oil toward the bus bar 30. The discharge port for cooling the motor and the supply port 51 for cooling the bus bar are provided at different positions in the axial direction.

As described above, according to the embodiment, the oil discharged from the cooling pipe 50 can be supplied to the bus bar 30. Cooling the bus bar 30 with oil enables heat generated by the motor 10 to be suppressed from being transferred to the inverter 20 via the bus bar 30. That is to say, the bus bar 30, the motor 10, and the inverter 20 can be cooled by using the cooling pipe 50 that supplies oil to the motor 10. Accordingly, no additional parts are required to cool the bus bar 30, the motor 10, and the inverter 20. Thus, the motor 10 and the inverter 20 can be cooled using oil, without increase in the size of the structure.

Also, the inverter 20 integrated with the motor case 11 is situated diagonally upward from the motor 10, at a position downward from the upper face 11a of the motor case 11. Accordingly, the inverter 20 can be disposed at a low position, and the height of the unit (mechanical-electrical integrated structure) can be reduced.

Further, the position at which the inverter 20 is installed is a position at which the inverter 20 does not project beyond the upper face 11a and the front face 11b of the motor case 11. This enables reduction in the height and the size of the mechanical-electrical integrated structure in which the inverter 20 and the motor case 11 are integrated, and the degree of freedom in installation of the unit is improved. Further, due to the inverter 20 being situated inwardly from the front face 11b of the motor case 11, the inverter 20 is protected by the motor case 11 in a collision of the electric vehicle 1, and safety regarding the high-voltage electricity of the inverter 20 can be ensured.

Note that the electric vehicle 1 is not limited to a hybrid vehicle such as exemplified above, and may be a fully electric vehicle.

Further, in the electric vehicle 1, the configuration of the power transmission device provided between the motor 10 and the driving wheels is not limited in particular. That is to say, the power transmission device may include a transmission having a single-axis structure (single-axis reduction gears), or may include a transmission having a multi-axis structure (multi-axis reduction gears). In the above-described embodiment, a power transmission device in which the drive shaft is situated on the same axial line as the motor 10 has been described. Accordingly, as a modification, the electric vehicle 1 may be equipped with a power transmission device including multi-axis reduction gears. A modification thereof is illustrated in FIG. 4.

Figure 4:
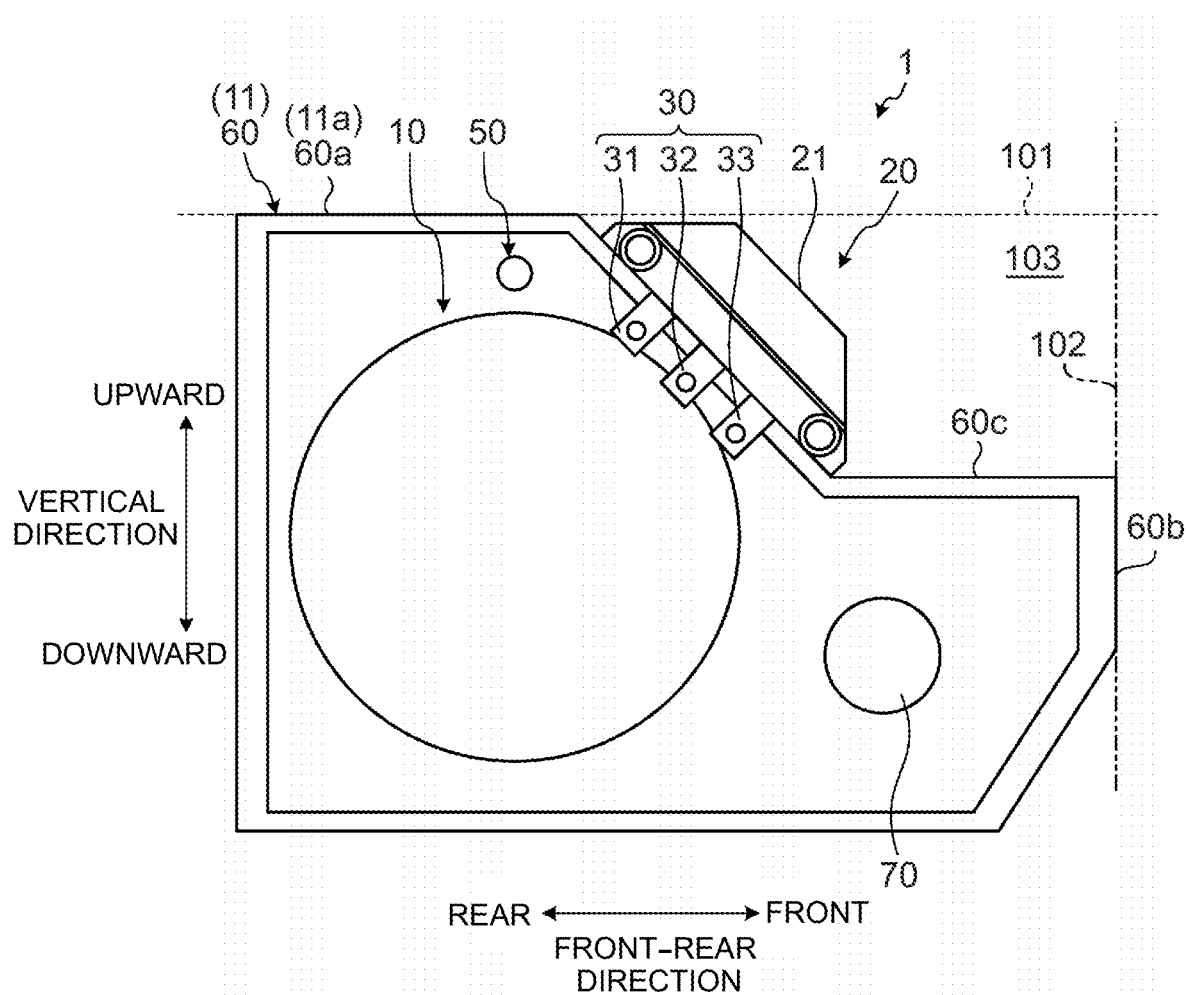
FIG. 4 is a diagram schematically illustrating a transaxle case accommodating a power transmission device having a multi-axis structure.

As illustrated in FIG. 4, in the electric vehicle 1 according to the modified embodiment, a drive shaft 70 is situated on a different axial line from the axial line of the motor 10. In this case, the motor case 11 is integrated with a transaxle case 60 that accommodates the power transmission device. The inside of the motor case 11 and the inside of the transaxle case 60 communicate with each other. The oil for lubricating the power transmission device provided in the transaxle case 60, and the oil for cooling the motor 10 and the bus bar 30 provided in the motor case 11, are the same oil shared in common.

Further, in this modified embodiment, the inverter 20 is situated at a position not projecting beyond an upper face 60a and a front face 60b of the transaxle case 60. As illustrated in FIG. 4, the inverter 20 is situated within the space 103 surrounded by the first plane 101 that is the same plane as an upper face 60a of the transaxle case 60, the second plane 102 that is the same plane as a front face 60b of the transaxle case 60, and an outer face 60c of the transaxle case 60. For example, the upper face 11a of the motor case 11 and the upper face 60a of the transaxle case 60 are formed at the same height. Accordingly, the inverter 20 is situated at a position lower than the upper face 11a of the motor case 11 and the upper face 60a of the transaxle case 60. On the other hand, the front face 60b of the transaxle case 60 is located forward of the front face 11b of the motor case 11. Accordingly, the inverter 20 is accommodated inwardly from (rearward of) the front face 60b of the transaxle case 60.

Further, the inverter 20 is not limited to being situated at the front face 11b side of the motor case 11, and may be situated on the rear face side of the motor case 11 instead. For example, the inverter 20 may be situated within the space 103 surrounded by the first plane 101 which is the same plane as the upper face 11a of the motor case 11, a second plane 104 (illustrated in FIG. 7) which is the same plane as a rear face 11d of the motor case 11, and the outer face 11c of the motor case 11. In this case, the inverter 20 is accommodated inwardly from (forward of) the rear face 11d of the motor case 11.

Further, when the structure in which the motor 10 is connected to the single-axis reduction gears is employed, the inverter 20 can be installed at a position not projecting beyond the upper face 11a and the front and rear faces of the motor case 11, as illustrated in FIG. 3. Further, when a structure in which the motor 10 is connected to the multi-axis reduction gears is employed, the inverter 20 can be installed at a position not projecting beyond the upper face 60a and the front and rear faces of the transaxle case 60, as illustrated in FIG. 4. In this way, even in a multi-axis structure in which the rotor shaft 14 and the drive shaft 70 are situated in parallel, the inverter 20 is protected by the transaxle case 60 and the motor case 11 in a collision, and safety regarding the high-voltage electricity of the inverter 20 can be ensured.

Figure 5:
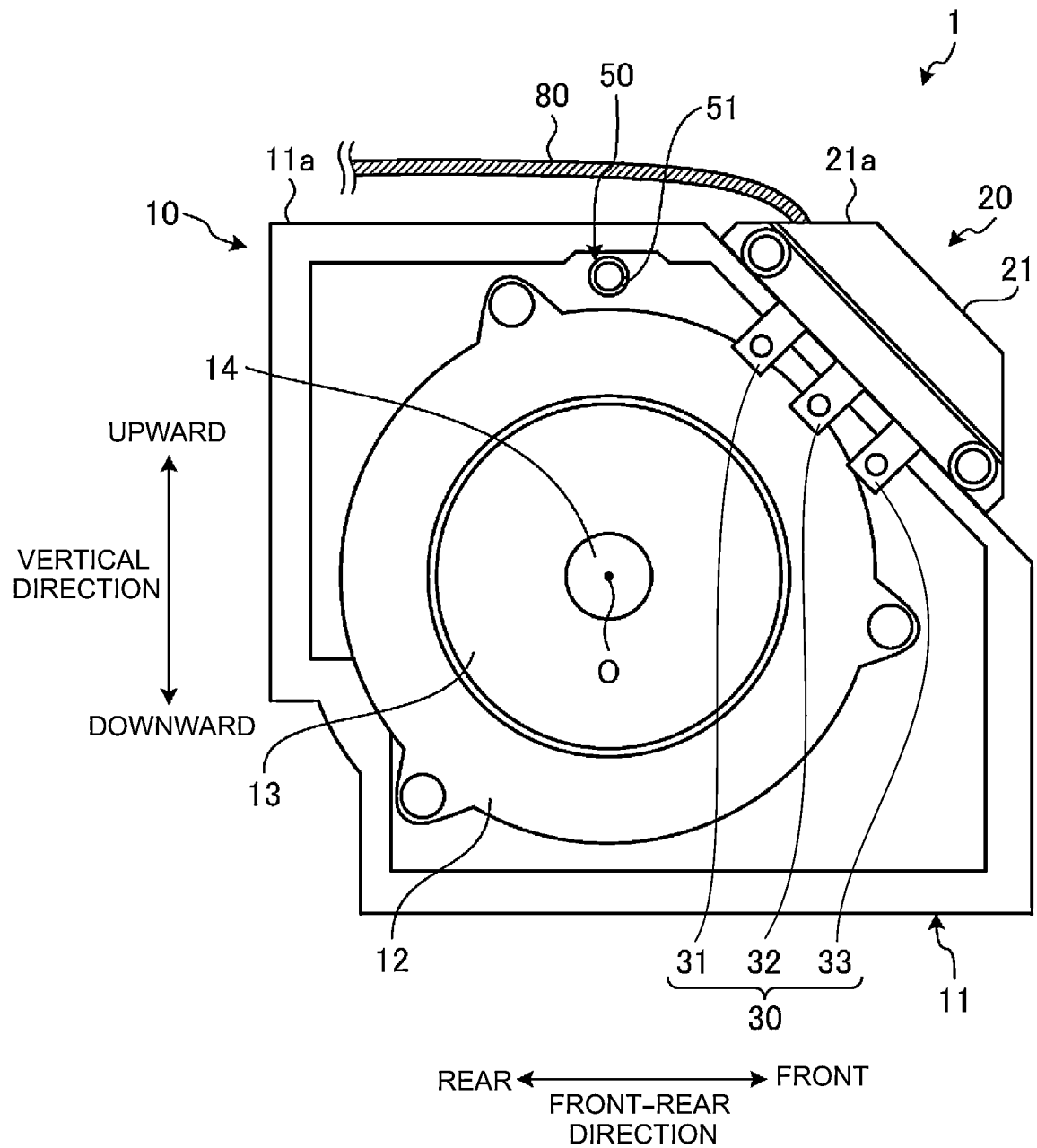
FIG. 5 is a diagram for describing a connection position of a cable.
Figure 6:
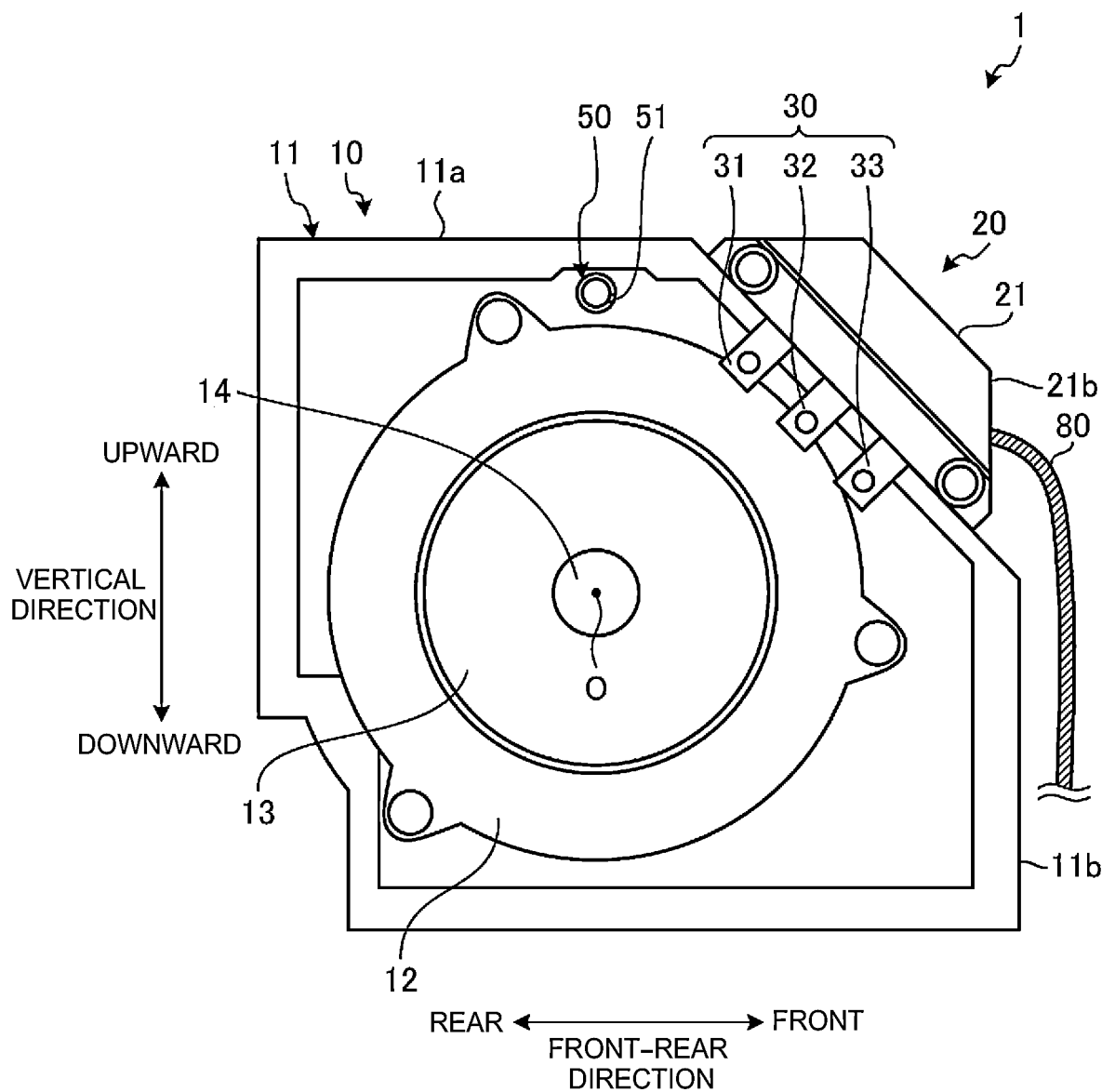
FIG. 6 is a diagram illustrating another example of the connection position of the cable.

Also, a cable 80 that supplies the high-voltage electric power from the battery to the inverter 20 may be connected to either an upper face 21a side or a front face 21b side of the inverter case 21. As illustrated in FIG. 5, the cable 80 extends from the upper face 21a of the inverter case 21, and the cable 80 can be situated upward from the inverter case 21 and the motor case 11. Alternatively, as illustrated in FIG. 6, the cable 80 may extend from the front face 21b of the inverter case 21, with the cable 80 situated forward from the inverter case 21 and the motor case 11. This enables the direction in which the cable 80 is laid to be changed without changing the unit depending on the position of a part to which the cable 80 is to be connected (e.g., battery, charger, etc.).

Figure 7:
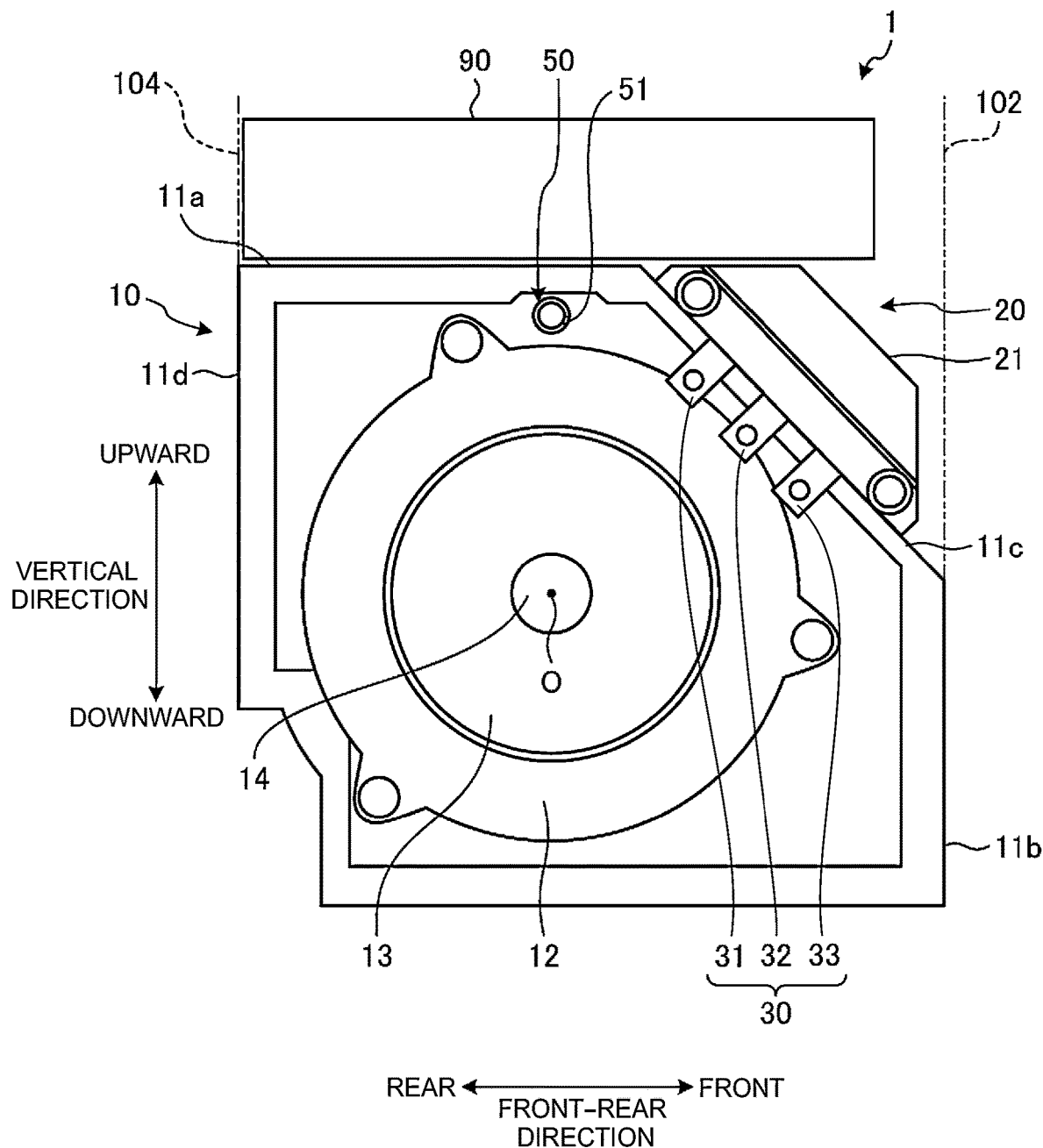
FIG. 7 is a diagram for describing positioning of a charger with respect to the motor case.

Also, as another modified embodiment, an accessory part 90, such as a charger, may be situated upward from the motor case 11. For example, as illustrated in FIG. 7, the accessory part 90 may be situated in the space upward from the motor case 11. Note that the accessory part 90 may be integrated with the upper face 11a of the motor case 11 and the upper face 21a of the inverter case 21. Further, the accessory part 90 is electrically connected to the inverter 20. In this case, the accessory part 90 and the inverter 20 may be connected via the cable 80, or may be connected via a bus bar (different from the bus bar 30).

The oil pump provided in the cooling mechanism is configured of an electric pump. Accordingly, the electric pump can be driven even when the motor 10 is not being driven, and thus oil can be supplied to the bus bar 30 and the motor 10.

What is claimed is:
1. An electric vehicle, comprising:
   a rotating electrical machine;
   a motor case that accommodates the rotating electrical machine;
   a cooling mechanism that is configured to supply oil to the rotating electrical machine and cool the rotating electrical machine;
   an inverter that is configured to drive the rotating electrical machine; and
   a connecting member that electrically connects the inverter and the rotating electrical machine, wherein
   the electric vehicle is of a structure in which the inverter is integrated with the motor case,
   the cooling mechanism includes a cooling pipe situated upward from the rotating electrical machine inside the motor case,
   the cooling pipe has
      a discharge port situated upward from the rotating electrical machine inside the motor case and open towards the rotating electrical machine to discharge the oil to the rotating electrical machine to cool the rotating electrical machine, and
      a supply port provided inside the motor case at a position upward from the rotating electrical machine,
   the connecting member includes a portion provided inwardly in a radial direction from an outer periphery of the rotating electrical machine inside the motor case, at a position upward from a rotation center of the rotating electrical machine and downward from the supply port, and
   the supply port is open towards the portion of the connecting member to discharge the oil to the connecting member to cool the connecting member.

2. The electric vehicle according to claim 1, wherein the inverter is situated within a space surrounded by a first plane that is a same plane as an upper face of the motor case, a second plane that is a same plane as a front face or a rear face of the motor case, and an outer face of the motor case.

3. The electric vehicle according to claim 1, wherein a part of the connecting member is provided at a same position as a position of the supply port in an axial direction of the rotating electrical machine.

4. The electric vehicle according to claim 1, further comprising
   a cable configured to supply electric power from a battery to the inverter, wherein the cable extends from an upper face side or a front face side of the inverter.

5. The electric vehicle according to claim 1, further comprising an accessory part electrically connected to the inverter, wherein the accessory part is situated upward from the motor case or integrated with an upper face of the motor case.

6. The electric vehicle according to claim 1, further comprising
a power transmission device in which a drive shaft is situated on an axis different from an axis of the rotating electrical machine, wherein
the motor case is integrated with a transaxle case accommodating the power transmission device, and an inside of the motor case and an inside of the transaxle case communicate with each other, and
the power transmission device is configured to be lubricated by the oil.

7. The electric vehicle according to claim 1, wherein the supply port is configured to discharge the oil outside the cooling pipe to the connecting member.

8. The electric vehicle according to claim 1, wherein the cooling mechanism further includes an electric pump configured to be driven even when the rotating electrical machine is not being driven.

9. The electric vehicle according to claim 1, wherein the discharge port for cooling the rotating electrical machine and the supply port for cooling the connecting member are at different positions of the cooling pipe in an axial direction of the rotating electrical machine.

10. The electric vehicle according to claim 9, wherein the inverter is situated within a space surrounded by a first plane that is a same plane as an upper face of the motor case, a second plane that is a same plane as a front face or a rear face of the motor case, and an outer face of the motor case.

11. The electric vehicle according to claim 10, further comprising
a cable configured to supply electric power from a battery to the inverter, wherein the cable extends from an upper face side or a front face side of the inverter.

12. The electric vehicle according to claim 11, further comprising
an accessory part electrically connected to the inverter, wherein the accessory part is situated upward from the motor case or integrated with an upper face of the motor case.

13. The electric vehicle according to claim 12, further comprising
a power transmission device in which a drive shaft is situated on an axis different from an axis of the rotating electrical machine, wherein
the motor case is integrated with a transaxle case accommodating the power transmission device, and an inside of the motor case and an inside of the transaxle case communicate with each other, and
the power transmission device is configured to be lubricated by the oil.

14. The electric vehicle according to claim 13, wherein the cooling mechanism further includes an electric pump configured to be driven even when the rotating electrical machine is not being driven.

15. The electric vehicle according to claim 14, wherein the supply port is configured to discharge the oil outside the cooling pipe to the connecting member, to cool the connecting member and the inverter.

* * * * *